US007664718B2

(12) United States Patent
Acharya et al.

(10) Patent No.: US 7,664,718 B2
(45) Date of Patent: Feb. 16, 2010

(54) METHOD AND SYSTEM FOR SEED BASED CLUSTERING OF CATEGORICAL DATA USING HIERARCHIES

(75) Inventors: Chiranjit Acharya, San Jose, CA (US); Tsunayuki Ohwa, Kawasaki (JP); Mark Plutowski, Santa Cruz, CA (US); Takashi Usuki, Yokohama (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 431 days.

(21) Appl. No.: 11/457,115

(22) Filed: Jul. 12, 2006

(65) Prior Publication Data

US 2007/0271292 A1 Nov. 22, 2007

Related U.S. Application Data

(63) Continuation-in-part of application No. 11/436,142, filed on May 16, 2006.

(51) Int. Cl.
*G06E 1/00* (2006.01)
*G06E 3/00* (2006.01)

(52) U.S. Cl. .............................. 706/45; 706/46; 706/20

(58) Field of Classification Search ....................... None
See application file for complete search history.

(56) References Cited

U.S. PATENT DOCUMENTS 6,460,036 B1 10/2002 Herz
2002/0042793 A1 4/2002 Choi
2003/0126561 A1 7/2003 Woehler et al.
2003/0177000 A1 9/2003 Mao et al.
2003/0217052 A1 11/2003 Rubenczyk et al.
2004/0111438 A1 6/2004 Chitrapura et al.
2005/0044487 A1 2/2005 Bellegarda et al.
2006/0004747 A1 1/2006 Weare
2006/0031217 A1 2/2006 Smith et al.
2006/0095521 A1 5/2006 Patinkin

OTHER PUBLICATIONS

Conrad et al., Jack G, “Effective Document Clustering for Large Heterogeneous Law Firm Collections”, 2005.*
de Queiroz et al., Kevin, “Phylogeny as a Central Principle in Taxonomy: Phylogenetic Defintion of Taxon Names”, 2002.*
Dhar et al., Vasant, “Discovering Interesting Patterns for Investment Decision Making with GLOWER—A Genetic Learner Overlaid with Entropy Reduction”, 2000.*
U.S. Appl. No. 11/436,142, filed May 16, 2006, Acharya et al.

(Continued)

*Primary Examiner*—David R Vincent
*Assistant Examiner*—Adrian L Kennedy
(74) *Attorney, Agent, or Firm*—Fitch, Even, Tabin & Flannery

(57) ABSTRACT

A computerized method of representing a dataset with a taxonomy includes augmenting a dataset containing a plurality of records with a plurality of predetermined exemplars; representing the plurality of records and predetermined exemplars within the augmented dataset as a plurality of clusters in an initial taxonomy layer; generating a truncated hierarchy of cluster sets based on clusters within the initial taxonomy layer, wherein clusters within the truncated hierarchy contain no more than a predetermined number of exemplars; and labeling clusters within the truncated hierarchy.

16 Claims, 8 Drawing Sheets

OTHER PUBLICATIONS

U.S. Appl. No. 11/457,064, filed Jul. 12, 2006, Acharya et al.
U.S. Appl. No. 11/457,090, filed Jul. 12, 2006, Acharya et al.
U.S. Appl. No. 11/457,095, filed Jul. 12, 2006, Acharya et al.
U.S. Appl. No. 11/457,103, filed Jul. 12, 2006, Acharya et al.
U.S. Appl. No. 11/457,107, filed Jul. 12, 2006, Acharya et al.
USPTO, Non Final Office Action from U.S. Appl. No. 11/457,090, mailed Feb. 10, 2009.
USPTO, Interview Summary for U.S. Appl. No. 11/457,064, mailed May 4, 2009.
USPTO, Non Final Office Action from U.S. Appl. No. 11/457,064, mailed Feb. 2, 2009.
USPTO, Non Final Office Action from U.S. Appl. No. 11/457,095, mailed Feb. 9, 2009.
USPTO, Non Final Office Action from U.S. Appl. No. 11/457,103, mailed Feb. 9, 2009.
USPTO, Non Final Office Action from U.S. Appl. No. 11/457,107, mailed Feb. 9, 2009.
Final Office Action from U.S. Appl. No. 11/457064 mailed Aug. 14, 2009.
Notice of Allowance for U.S. Appl. No. 11/457095 mailed Aug. 13, 2009.
Examiner Interview Summary from U.S. Appl. No. 11/457095 mailed Aug. 13. 2009.
Final Office Action from U.S. Appl. No. 11/457103 mailed Aug. 19, 2009.
Final Office Action for U.S. Appl. No. 11/457090 mailed Aug. 19, 2009.
Lee, John W. et al., "Hierarchical Clustering Based on Ordinal Consistency", Department of Computing, Hong Kong Polytechnic University, Hung Horn, Kowloon, Hong Kong. Received Sep. 2, 2004, accepted May 16, 2005. Pattern recognition 38 (2005) 1913-1925.
Lee, John W., "Order Invariant Hierarchical Clustering", Department of Computing, Hong Kong Polytechnic University, Department of Rehabilitation Sciences, Hong Kong Polytechnic University, Hung Horn, Hong Kong, China 2002 IEEE, 6 pgs.

* cited by examiner

METHOD AND SYSTEM FOR SEED BASED CLUSTERING OF CATEGORICAL DATA USING HIERARCHIES

This application is a continuation-in-part of U.S. application Ser. No. 11/436,142, filed May 16, 2006, entitled "CLUSTERING AND CLASSIFICATION OF CATEGORY DATA" to Acharya et al., which is incorporated in its entirety herein by reference.

BACKGROUND

1. Field of Invention

Embodiments of the present invention relate generally to methods and systems adapted to cluster categorical data. More specifically, embodiments of the present invention relate to methods and systems adapted to cluster categorical data using a seed based clustering technique.

2. Discussion of the Related Art

Data is often organized in a clustering process by separating an arbitrary dataset into a plurality of subsets (i.e., clusters) according to some inherent similarity measure between data within the dataset, wherein data within a particular cluster is characterized by some common trait or attribute. Subsequently, category labels are generated using the clusters and a classifier for the dataset is constructed using the category labels. Clustering processes can be characterized according to the manner in which they form clusters. Two common clustering techniques include partitional and hierarchical techniques.

Partitional clustering techniques organize a dataset into a single collection of clusters that usually do not overlap, wherein data within each cluster is uniformly similar. Unconstrained hierarchical clustering algorithms, on the other hand, create a hierarchy of clusters representing a range (e.g., from coarse to fine) of intra-cluster similarity. Such hierarchical clustering algorithms are generally classified according to the manner in which they construct the cluster hierarchy. Thus, agglomerative hierarchical clustering algorithms build the cluster hierarchy from the bottom up by progressively merging smaller clusters into larger clusters while divisive hierarchical clustering algorithms build the hierarchy from the top down by progressively dividing larger clusters to form smaller clusters.

Generally, many clustering algorithms work well when the dataset is numerical (i.e., when data within the dataset are all related by some inherent similarity metric or natural order). Numerical datasets often describe a single attribute or category. Categorical datasets, on the other hand, describe multiple attributes or categories that are often discrete, lacking a natural similarity measure between them. From the clustering perspective this also implies that appropriate exemplar codebook vectors (i.e., seeds) are, at best, difficult to obtain. Therefore, categorical data is usually not effectively clustered using partitional clustering techniques. Conventional hierarchical clustering techniques do not require codebook vectors and are somewhat more effective than partitional clustering techniques, but their usefulness is limited to simple pattern-matching applications and does not provide meaningful numerical quantities from the categorical dataset. In some cases, however, a user of a hierarchical agglomerative clustering system may have some previous knowledge of a record and wish to retrieve records within the dataset that are similar to the previously known record.

Accordingly, it would be beneficial to provide a system and method capable of clustering a categorical dataset in a manner that can meaningfully and numerically quantify the dataset.

Moreover, it would be beneficial to provide a system and method of merging data points/clusters of data points in such a manner as to exploit prior information known to the user (e.g., represented within a codebook).

SUMMARY

Several embodiments disclosed herein advantageously address the needs above as well as other needs by providing a method and a system for seed based clustering of categorical data.

One embodiment describes a computerized method of representing a dataset with a taxonomy. First, a dataset containing a plurality of records with is augmented with a plurality of predetermined exemplars. The plurality of records and predetermined exemplars are then represented within the augmented dataset as a plurality of clusters in an initial taxonomy layer. Subsequently, a truncated hierarchy of cluster sets is generated based on clusters within the initial taxonomy layer such that clusters within the truncated hierarchy contain no more than a predetermined number of exemplars. Clusters within the truncated hierarchy can also be labeled.

Another embodiment describes a computer program product including a computer usable medium having computer readable code embodied therein for causing a computer to effect augmenting a dataset containing a plurality of records with a plurality of predetermined exemplars. The computer readable code is further adapted to cause the computer to represent the plurality of records and predetermined exemplars within the augmented dataset as a plurality of clusters in an initial taxonomy layer. The computer readable code is also adapted to cause the computer to generate a truncated hierarchy of cluster sets based on clusters within the initial taxonomy layer, wherein clusters within the truncated hierarchy contain no more than a predetermined number of exemplars. Additionally, the computer readable code is adapted to cause the computer to label clusters within the truncated hierarchy.

By implementing the embodiments exemplarily described above, a seed based clustering technique enables clusters to be organized in a particular manner to reflect, for example, a user's previous knowledge of an exemplar codebook.

BRIEF DESCRIPTION OF THE DRAWINGS

The above and other aspects, features and advantages of several embodiments exemplarily described herein will be more apparent from the following more particular description thereof, presented in conjunction with the following drawings.

Figure 1:
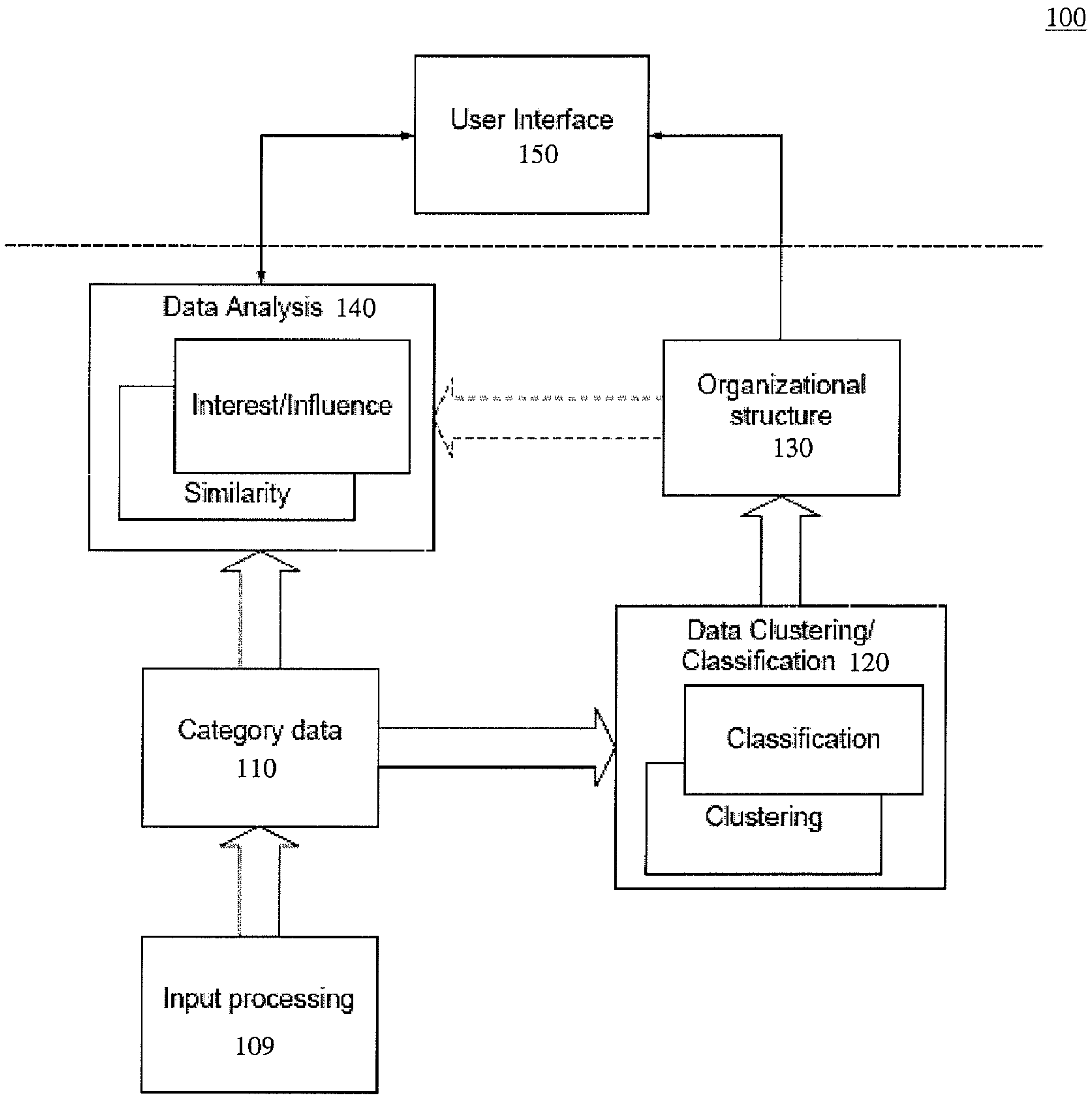
FIG. 1 illustrates a diagram of a system for assisting a user in searching and automatically organizing information.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. It is to be understood that other embodiments may be utilized and that logical, mechanical, electrical and other changes may be made without departing from the spirit or scope of the numerous disclosed embodiments of the present invention. The scope of the numerous disclosed embodiments of the present invention should be determined with reference to the claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. All of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It will be appreciated that more or fewer processes may be incorporated into the methods illustrated in the flow diagrams discussed below without departing from the scope of the numerous disclosed embodiments of the present invention. Describing the methods by reference to a flow diagram enables one skilled in the art to develop such programs including such instructions to carry out the methods on suitably configured hardware platforms and operating environments. The computer-executable instructions may be written in a computer programming language or may be embodied in firmware logic. If written in a programming language conforming to a recognized standard, such instructions can be executed on a variety of hardware platforms and operating environments and for interface to a variety of operating systems. In addition, embodiments of the present invention are not described with reference to any particular programming language. It will be appreciated that a variety of programming languages may be used to implement the teachings of the disclosed embodiments.

FIG. 1 illustrates a diagram of a system 100 for assisting a user in searching and automatically organizing information, such as content, which can be characterized by categorical data 110. Such content may be, for example, recorded TV programs, electronic program guide (EPG) entries, and multimedia content. The system 100 may further assist the user in tracking preferences of the user, and may also provide recommendations to the user. The system 100 can further be used by the user to search by example and/or by query.

As shown in FIG. 1, the system 100 includes an input processing module 109, a clustering/classification module 120, a data analysis module 140, and a user interface 150. Also shown in FIG. 1 are categorical data 110 and an organizational structure 130.

Categorical data describes multiple attributes or categories. Often the categories are discrete and lack a natural similarity measure between them. The input processing module 109 pre-processes input data into categorical data and load the categorical data 110.

The categorical data 110 is grouped into clusters, and/or classified into folders by the clustering/classification module 120. The category and classification methods described herein can operate on any arbitrary categorical dataset. Generally, clustering of categorical data 110 is the process of identifying a set of underlying patterns in categorical data points within a data set and grouping the data points into one or more groups or clusters based on some measure of similarity. According to numerous embodiments disclosed herein, the clustering/classification module 120 can cluster the categorical data 110 by using seed based clustering techniques. By implementing the seed based clustering techniques disclosed herein, clusters can be organized in a particular manner to reflect, for example, a user's previous knowledge of an exemplar codebook.

The knowledge of category distribution obtained in the process of clustering is used to construct a classifier for some data spaces. Classification is the task of assigning data points to one or more of the identified categories based on some predefined proximity or divergence measure.

According to numerous embodiments described herein, the clustering/classification module 120 uses a folder-based classification system. The folder-based classification system allows a user to build a classifier by creating a group of folders. Each folder within the group is instantiated by a number of exemplary categorical data records.

In one embodiment, one or more of the exemplary records may be input by the user. Accordingly, a group of folders created by the user may act as a classifier such that new categorical data records are compared against the user-created group of folders and automatically sorted into the most appropriate folder.

The output of the clustering/classification module 120 is an organizational data structure 130, such as a dendrogram, a cluster tree, or a matrix, collectively referred to herein as a taxonomy. A cluster tree may be used as an indexed organization of the categorical data or to select a suitable cluster of the data.

Many clustering applications require identification of a specific layer within a cluster tree that best describes the underlying distribution of patterns within the categorical data. In one embodiment, an output of the clustering/classification module 120 includes an optimal layer that contains a unique cluster group containing an optimal number of clusters.

A data analysis module 140 may use the folder-based classifiers and/or classifiers generated by clustering operations for automatic recommendation or selection of content. The data analysis module 140 may automatically recommend or provide content that may be of interest to a user or may be similar or related to content selected by a user. In one embodiment, the data analysis module 140 assigns categorical data records for new content items with the appropriate folders based on similarity.

A user interface 150 also shown in FIG. 1 is designed to assist the user in searching and automatically organizing content using the system 100.

Although shown in FIG. 1 as specific separate modules, the clustering/classification module 120, organizational data structure 130, and the data analysis module 140 may be implemented as different separate modules or may be combined into one or more modules.

Figure 2:
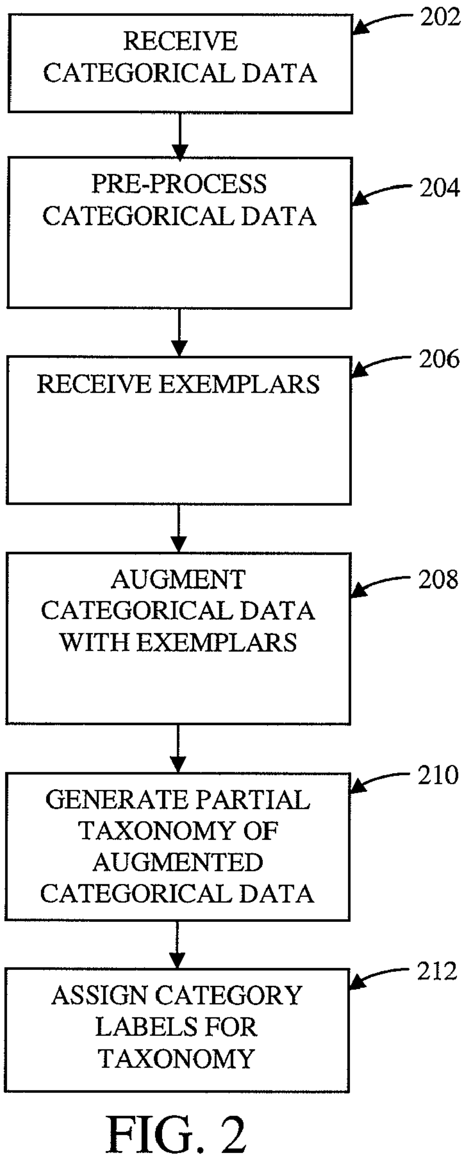
FIG. 2 illustrates an exemplary process of generating a partial taxonomy of categorical data in accordance with embodiments of the present invention.

FIG. 2 illustrates an exemplary process of generating a partial taxonomy of categorical data in accordance with embodiments of the present invention.

Referring to FIG. 2, an exemplary process flow of generating a partial taxonomy of categorical data proceeds as follows: receive input data (202), pre-process the received input data into the aforementioned categorical data (204), receive a plurality of exemplars (206), augment the pre-processed categorical data with the plurality of exemplars (208), generate a partial taxonomy of the augmented categorical data (210), and assign category labels for the generated taxonomy (212).

In one embodiment, the input data received at 202 includes a plurality of records electronically input into the system 100. As used herein, a record can be a document, a video, photograph, music, or the like, or any combination thereof.

An exemplary process flow of pre-processing the dataset at 204 is discussed below with respect to FIG. 3.

Figure 3:
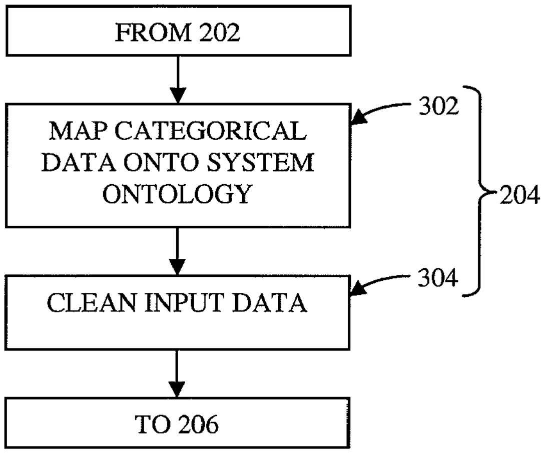
FIG. 3 illustrates an exemplary pre-processing method as applied to categorical data in accordance with embodiments of the present invention.

Referring to FIG. 3, each record is mapped onto a system ontology (302) and the dataset formed from the records is "cleaned" (304).

In one embodiment, records within the received dataset can be mapped onto predetermined fields of a system ontology at 302. The format of the data, the transformations expected, and the format of the output data are specified in a language designed to describe metadata such as RDF. RDF employs a graph-based data model with a well-defined entailment relation. RDF is expressed in an XML format, the syntax of which explicitly specifies the parameters required and simplifies specification of the transformation process.

Figure 4:
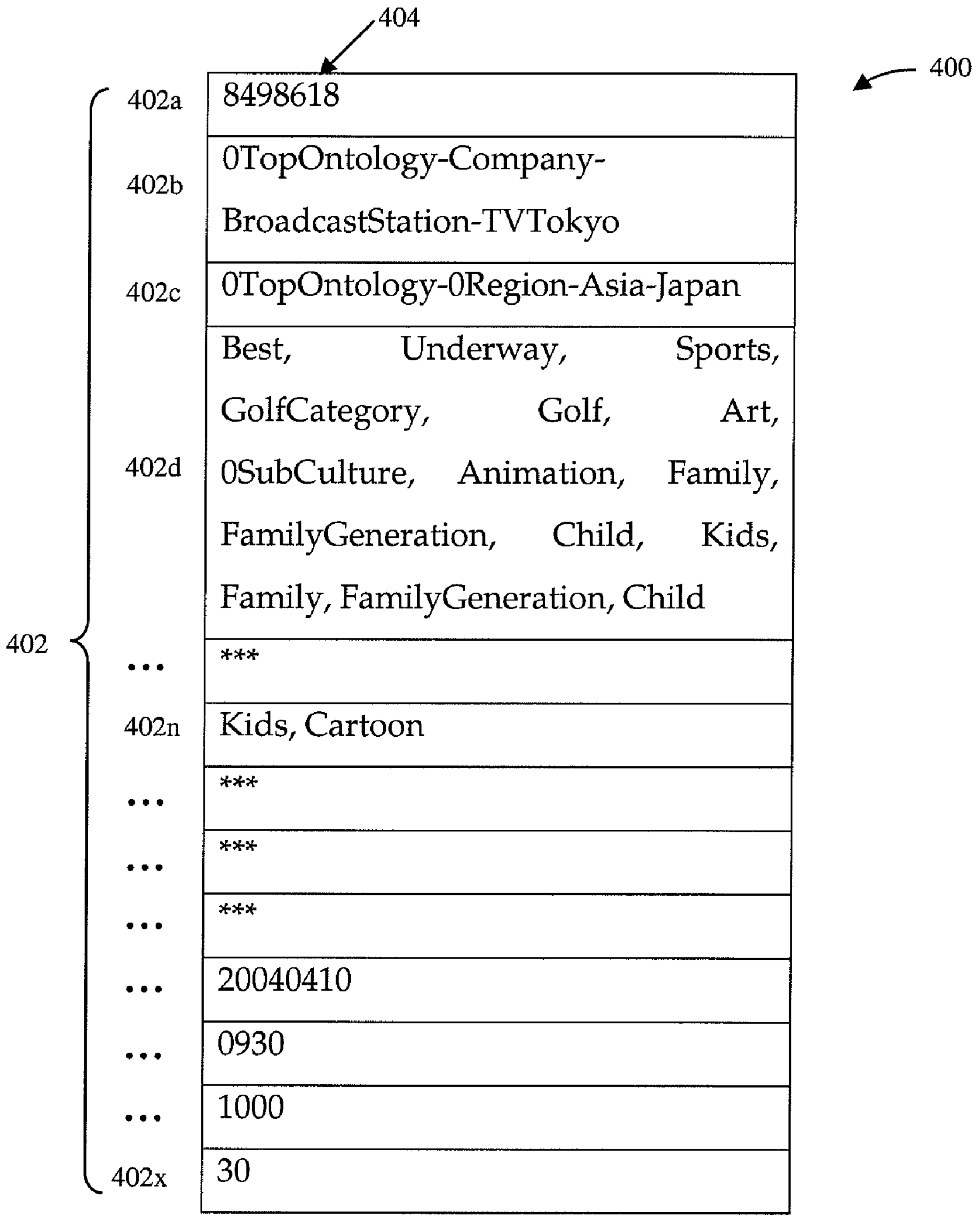
FIG. 4 illustrates an exemplary ontology onto which records containing categorical data are mapped in accordance with embodiments of the present invention.

FIG. 4 illustrates an exemplary ontology onto which records containing categorical data are mapped in accordance with embodiments of the present invention.

As shown in FIG. 4, the ontology 400 is characterized by a plurality of attributes 402 (i.e., 402*a* to 402*x*), wherein each attribute is further characterized by one or more terms 404. In one embodiment, the predetermined ontology adds abstract terms to particular attributes of a record to facilitate processing of the electronic record by the system 100. The ontology thus provides a means for uniformly representing records in a manner that the system 100 can recognize efficiently.

As shown in FIG. 4, a received record can be a document describing a particular television program. Data mapped into a first attribute 402*a* (i.e., an "identification attribute") corresponds to record identifier (e.g., a particular television program) and is characterized by the term "8498618"; data mapped into another attribute 402*d* (i.e., a "descriptor attribute") corresponds to keywords for the television program identified in attribute 402*a* and is characterized by the terms listed from "Best" to "Child"; data mapped into attribute 402*n* (i.e., a "genre attribute") corresponds to the genre for the television program identified in attribute 402*a* and is characterized by the terms "Kids" and "Cartoon"; data mapped into other attributes correspond to the date, start time, end time, duration, of the television program identified in attribute 402*a* and are characterized by the terms "20040410", "0930", "1000", and "30", respectively. In one embodiment, the term "*" represents missing data. In another embodiment, the same term can appear multiple times within the same attribute (e.g., the keyword attribute 402***d* contains multiple instances of the term "Family". In the illustrated embodiment, terms such as "0SubCulture" are abstract terms supplemented by the ontology.

Records are represented within the system as vectors. The dimension of each vector corresponds to the total number of terms characterizing all attributes found in all records processed by the system (i.e., the global vocabulary of the system). Values assigned to components of a vector represent the presence of a term within a corresponding record. For example, a vector component can be binarily represented as either a 0 (indicating the absence of a term from a record) or a 1 (indicating the presence of a term in a record).

For example, suppose that the vocabulary for the entire collection of records and attributes (i.e., the global vocabulary) consists of only six terms: A, B, C, D, E, and F. Let a first record $d_1$ include the terms A, B, D, and E and a second record $d_2$ include the terms C, D, and F. Accordingly, the first record $d_1$ can be binarily represented by a six-dimensional vector $d_1=\{1, 1, 0, 1, 1, 0\}$ and the second record $d_2$ can be binarily represented by a six-dimensional vector $d_2=\{0, 0, 1, 1, 0, 1\}$. As shown above, the global vocabulary consists of only six terms. In practice, however, the global vocabulary includes thousands of terms, wherein any particular record includes only a relatively small number terms. Accordingly, only a relatively few number of vector components are assigned non-zero values. In practice, therefore, records are typically represented as highly "sparse" vectors that can be difficult to process to efficiently generate taxonomies and yield inaccurate results. To increase the efficiency with which taxonomies are generated, and to produce more accurate results, each record is "cleaned" at 304.

In other embodiments, vector components can be numerically represented (as opposed to binarily represented) by a value corresponding to the number of times that a term occurs in a record (i.e., the frequency of the term in the record) or by a normalized value corresponding to the number of times that a term occurs in a record in addition to the total number of terms the record contains (i.e., the normalized frequency of the term in the record). An exemplary process flow of performing the cleaning at 304 is discussed below with respect to FIG. 5.

Figure 5:
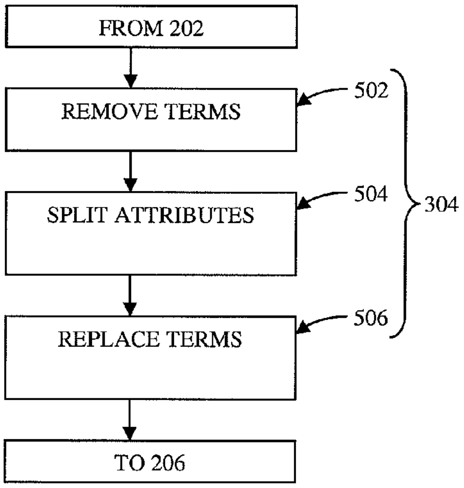
FIG. 5 illustrates an exemplary process of cleaning categorical data in accordance with embodiments of the present invention.

Referring to FIG. 5, a record can be cleaned, for example, by removing terms (502), splitting attributes (504), and replacing terms (506).

In one embodiment, terms can be removed by removing terms from attributes that are not generally useful in generating a folder set or in classifying records based on the generated folder set. Non-useful terms can be identified as those that occur infrequently (e.g., once) within a particular attribute of a record. By removing terms from each record, the total number of terms within the attribute vocabulary can be significantly reduced. For example, suppose the system receives 2154 records describing television programs playing over the course of a week. Such a collection of records may include 3016 description keywords, wherein each record contains an average of 5.37 keywords, wherein each keyword occurs an average of 4.29 times, and wherein 1113 keywords occur just once. By removing the keywords occurring just once, the size of the description keyword attribute space can be reduced by about 33%.

In one embodiment, the attributes are split by splitting large record attributes (i.e., attributes characterized by a large number of unique terms) into a plurality of smaller sub-attributes characterized by a smaller number of unique terms. By splitting a large record attribute into small sub-attributes, probabilities can be normalized over smaller, less sparse domains and yield more accurate results. Further, each sub-attribute can be weighted to reflect its relative importance within the record.

In one embodiment, a large attribute can be split into a plurality of smaller sub-attributes by grouping terms within the large attribute based on their frequency of occurrence within the large attribute. In this case, it is assumed that terms occurring more frequently are more relevant, and thus more important, than terms occurring less frequently). As a result, information indicating relevance levels of particular sub-attributes is imparted and used as a weighting value to reflect the relative importance of each sub-attribute. The size and number of the sub-attributes created as a result of the splitting can be controlled, for example, by specifying the proportions of frequencies or value of frequencies desired in each sub-attribute.

In another embodiment, a large attribute can be split into a plurality of sub-attributes by grouping semantically-related terms. In this case, meanings of words may be internally generated or obtained from a lexical reference system such as WordNet, a lexical reference system developed at the Cognitive Science Laboratory at Princeton University. As a result, information indicating a certain degree of "common-sense" is imparted and used as a weighting value to reflect the relevance of each sub-attribute. The size and number of the sub-attributes created as a result of the splitting can be controlled using statistics about particular terms and term frequencies in the attribute. In one embodiment, the total number of occurrences of terms within each sub-attribute can be maintained within a predetermined range to control the degree of relatedness between terms in a particular sub-attribute or to control the abstractness of relationships between terms within a sub-attribute.

In one embodiment, terms that can be grouped together into a sub-attribute according to their semantic interrelatedness are identified using an "is-a" (hypernym) chain relation as applied to nouns.

Consider, for example, the following hypernym chains:

1. cat, feline, carnivore, placental, mammal, vertebrate, chordate, animal, organism, living thing, object, entity 2. dog, canine, carnivore, placental, mammal, vertebrate, chordate, animal, organism, living thing, object, entity 3. umbrella, canopy, shelter, protective covering, covering, artifact, object, entity Based on the first hypernym chain, a cat is a feline; a feline is a carnivore, etc. Based on the second hypernym chain, a dog is a canine; a canine is a carnivore, etc. Based on the third hypernym chain, an umbrella is a canopy; a canopy is a shelter, etc. As shown, the terms 'cat' and 'dog' share the 'carnivore' hypernym relation much earlier in the chain than they share the 'object' hypernym relation with the term 'umbrella'. Accordingly, the term 'cat' is more semantically related to the term 'dog' than it is related to the term 'umbrella'. As a result, a large attribute containing the terms 'cat,' 'dog,' and 'umbrella' will be split into a first sub-attribute containing the terms 'cat' and 'dog' and a second sub-attribute containing the term 'umbrella.' As will be appreciated, semantic relationships between terms changes as the structural taxonomy of the lexical reference system changes or as classes are inserted into or removed from a particular relation path. It will be appreciated, however, that terms other than the nouns appearing in WordNet can be grouped in a separate attribute space and downweighted if necessary.

In the example provided above, where the received records identify television programs, one large attribute may, for example, be divided into two smaller sub-attributes, wherein the first sub-attribute, related to recreation, contains the terms 'Recreation', 'Pachinko', 'Hobby', 'Fun', 'Entertainment', 'Encore', 'Swimming', 'Skating', 'Gymnastics', 'Hunting', 'Fishing', 'Tennis', 'Basketball', 'Golf', 'Soccer', 'Baseball', and 'Athletics' while the second sub-attribute, related to food, contains the terms 'Tofu', 'Food', 'Diet', 'Vitamin', 'Sushi', 'Soup', 'Pudding', 'Dessert', 'Chocolate', and 'Beverage'. In one embodiment, each of the terms identified above can be further divided into smaller sub-attributes according to a semantic relatedness between the terms.

In one embodiment, terms can be replaced by replacing specific terms with equivalent, more abstract terms. In this case, terms found, for example, in WordNet can be replaced with equivalent, more abstract terms. As a result, the number of unique terms characterizing an attribute of a record can be reduced because several specific terms can be mapped onto the same abstract term. Moreover, vector representations of records become much less sparse because each abstract term appears in more records and there are proportionately more abstract terms appearing in each record. The size and number of the sub-attributes created as a result of the term replacements can be controlled using statistics about particular terms and term frequencies in the attribute.

In the example provided above, where the received records identify television programs, the specific terms 'Brother', 'Sister', 'Grandchild', 'Baby', 'Infant', 'Son', 'Daughter', 'Husband', 'Mother', 'Parent', and 'Father' of an attribute can all be mapped onto an equivalent abstract term 'relative'. Similarly, the specific terms 'Hunting', 'Fishing', 'Gymnastics', 'Basketball', 'Tennis', 'Golf', 'Soccer', 'Football', and 'Baseball' of an attribute can all be mapped onto an equivalent abstract term 'sport'.

By cleaning each record as exemplarily described above with respect to FIG. 5, the total number of terms to be processed by the system 100 and/or the sparsity of vectors that represent records can be reduced. As a result, the efficiency with which folder sets are ultimately generated by the system 100, and the accuracy of results ultimately yielded may be increased. In one embodiment, the dataset D produced as a result of the pre-processing at 204 contains m records $d_1$, $d_2 \ldots, d_m$ and is characterized by an attribute space containing d attributes, $A_1, A_2, \ldots, A_d$. A generic attribute space $A_i$, where i=1, . . . , d, can be characterized by any combination of $n_i$ unique terms contained within a vocabulary $V_i=\{v_i^1, v_i^2, \ldots, v_i^{n_i}\}$ specific to $A_i$. Accordingly, a global vocabulary V contains n unique terms characterizing the global attribute space A (i.e., a combination of all attributes within the dataset D), such that $$n = \sum_{i=1}^{d} n_i.$$

The dataset D can be represented as an m×n matrix. Accordingly, each row of the m×n matrix corresponds to a vector-space representation of a particular record.

Once the categorical data has been pre-processed, a plurality of exemplars (e.g., x exemplars, where x<<m) are received at 206. In one embodiment, and as similarly discussed with respect the records received at 202, each exemplar can be represented as a vector having the same dimension as each record pre-preprocessed at 204, wherein values assigned to each component of the exemplar vector represent the presence of a term within the particular exemplar. In another embodiment, each exemplar can be labeled with a predetermined category label.

In one embodiment, the dataset D can be augmented with the received exemplars at 208 simply by treating the exemplars as records. Accordingly, the dataset D obtained as a result of augmenting the dataset D with the received exemplars at 208 contains m+x records $\{d_1, d_2, \ldots, d_m, d_{m+1}, \ldots, d_{m+x}\}$.

Once the input data has been pre-processed and augmented, a taxonomy can be generated at 210. In accordance with numerous embodiments, the taxonomy, Γ, generated at 210 is a partial taxonomy of the dataset D resulting from the augmentation at 208. A given layer $\Gamma_t$ within the partial taxonomy Γ contains a set of k(t) clusters nested within a hierarchically higher layer $\Gamma_{t+1}$, containing a set of k(t+1) clusters (k(t+1)<k(t)), such that $\Gamma_t \subset \Gamma_{t+1}$. Thus, each cluster in $\Gamma_t$ is a subset of a cluster in $\Gamma_{t+1}$ and at least one cluster in $\Gamma_t$ is a proper subset of a cluster in $\Gamma_{t+1}$. In one embodiment, the partial taxonomy Γ comprises g nested layers $\Gamma_1 \subset \Gamma_2 \subset \ldots \subset \Gamma_g$. The uppermost layer $\Gamma_g$ of the partial taxonomy Γ contains x clusters, collectively containing all of the m records and x exemplars. The bottommost layer $\Gamma_1$ of the partial taxonomy contains m+x singleton leaf clusters, each corresponding to one of the m records or x exemplars (i.e., seeds) within the dataset D. An exemplary process flow of a taxonomy generation process is discussed below with respect to FIG. 6.

Figure 6:
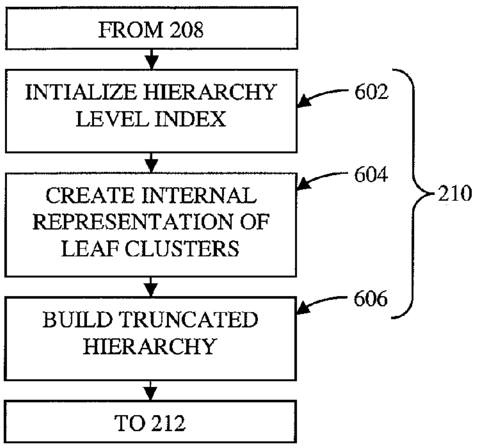
FIG. 6 illustrates an exemplary process of generating a taxonomy in connection with the process shown in FIG. 2.

Referring to FIG. 6, a taxonomy can be generated, for example, by initializing a hierarchy index of the taxonomy (602), creating an internal representation of leaf clusters (604), and building a truncated hierarchy of cluster sets from the leaf clusters (606).

Figure 7:
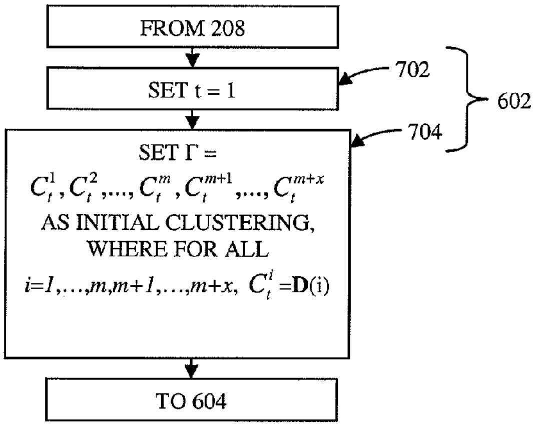
FIG. 7 illustrates an exemplary process of initializing a hierarchy level index in connection with the process shown in FIG. 6.

In one embodiment, the hierarchy index identifies layers within the taxonomy and, as shown above, is represented by the hierarchy index variable, t. Referring to FIG. 7, the hierarchy index can be initialized by setting the hierarchy index variable, t, equal to 1 (702) and setting each record within the dataset as a leaf cluster (704). As discussed above, each record $d_i \in D$ is identified by a vector. Accordingly, the bottommost layer of the taxonomy, $\Gamma_1$, contains a set of m+n clusters $C_1^1, C_1^2, \ldots, C_1^m, C_1^{m+1}, \ldots, C_1^{m+x}$, each of which are also identified by the underlying vector of the corresponding record (i.e., $C_1^i=d_i$ for all i=1, . . . , m, m+1, . . . , m+x). For the sake of ease of exposition, no formal distinction will be drawn between a leaf cluster and the underlying vector identifying the leaf cluster.

After initializing the hierarchy index at 602, an internal representation of the leaf clusters is created at 604.

In one embodiment, a generic cluster $C_t^i \in \Gamma_t$ can be internally represented by its conditional probability distribution $P(A|C_t^i)$, where $P(A=v_j|C_t^i)$ is the normalized probability of occurrence of the term $v_j$ in the cluster $C_t^i$. Similarly, a generic record $d_i \in D$ can be internally represented by its conditional probability distribution $P(A|d_i)$, where $P(A=V_j|d_i)$ is the normalized probability of occurrence of the term $v_j$ in $d_i$. The internal representation scheme described above is herein referred to as a globally normalized (i.e. g-norm) representation because the term-frequency vectors of all records and clusters are normalized across the global attribute space A to generate the probability mass function representation.

In another embodiment, each generic record $d_i \in D$ or cluster $C_t^i \in \Gamma_t$ can be internally represented as a set of d probability mass functions, one for each attribute. Accordingly, the internal representation of every record $d_i \in D$ is the disjunction of d locally normalized conditional probability distributions, $\{P(A_1|d_i) \wedge P(A_2|d_i) \wedge \ldots \wedge P(A_d|d_i)\}$ and the internal representation of every cluster $C_t^i \in \Gamma_t$ is the disjunction of d locally normalized conditional probability distributions, $\{P(A_1|C_t^i) \wedge P(A_2|C_t^i) \wedge \ldots \wedge P(A_d|C_t^i)\}$. The internal representation scheme described above is herein referred to as locally normalized (i.e., l-norm) representation.

Compared to g-norm, l-norm representation provides d degrees of freedom, as there are d entropy/information components corresponding to d probability distributions. The entropy/information components can be linearly combined in any manner, and therefore any type of clustering can be obtained varying the weight distribution across attributes. Moreover, g-norm representation propagates the effect of sparsity within one attribute to all other attributes whereas l-norm representation confines attribute-local sparsities to the same local attribute space.

Figure 8:
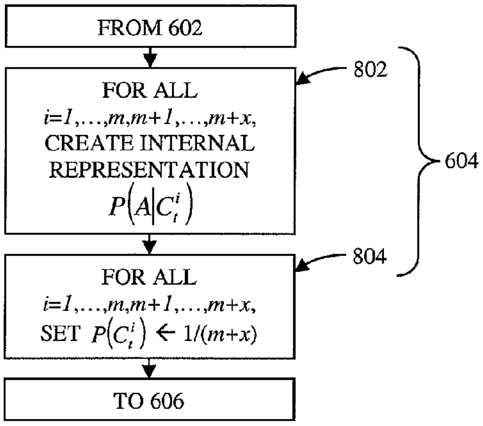
FIG. 8 illustrates an exemplary process of creating an internal representation of leaf clusters in connection with the process shown in FIG. 6.

Therefore, and as shown in FIG. 8, internal representations of each leaf cluster $C_1^1, C_1^2, \ldots, C_1^m, C_1^{m+1}, \ldots, C_1^{m+x}$ can be created by determining the conditional probability distribution $P(A|C_1^i)$ of each leaf cluster $C_1^i$ (for all i=1, . . . , m,m+1, . . . , m+x) (802), and setting the marginal probability $P(C_1^i)$ of each leaf cluster $C_1^i$ (for all i=1, . . . , m,m+1, . . . , m+x) equal to 1/(m+x) (804).

After creating the internal representation of the leaf clusters, the truncated hierarchy can be built at 606. In one embodiment, the truncated hierarchy is generated according to a constrained hierarchical agglomerative clustering process. In one embodiment, the constrained hierarchical agglomerative clustering process is a clustering process that partitions the dataset D into k mutually exclusive clusters (where k≦m), $C_1, C_2, \ldots, C_k$, such that the following conditions are satisfied:

1. For all i=1, . . . , k, $C_i$ is a non-null subset;
2. For all i, j=1, . . . , k, i≠j, $C_i$ and $C_j$ are non-overlapping, i.e., $C_i \cap C_j$ is null; and
3. All the clusters, when combined together, are exhaustive, i.e., $\cup_{i=1}^{k} C_i = D$.

Figure 9:
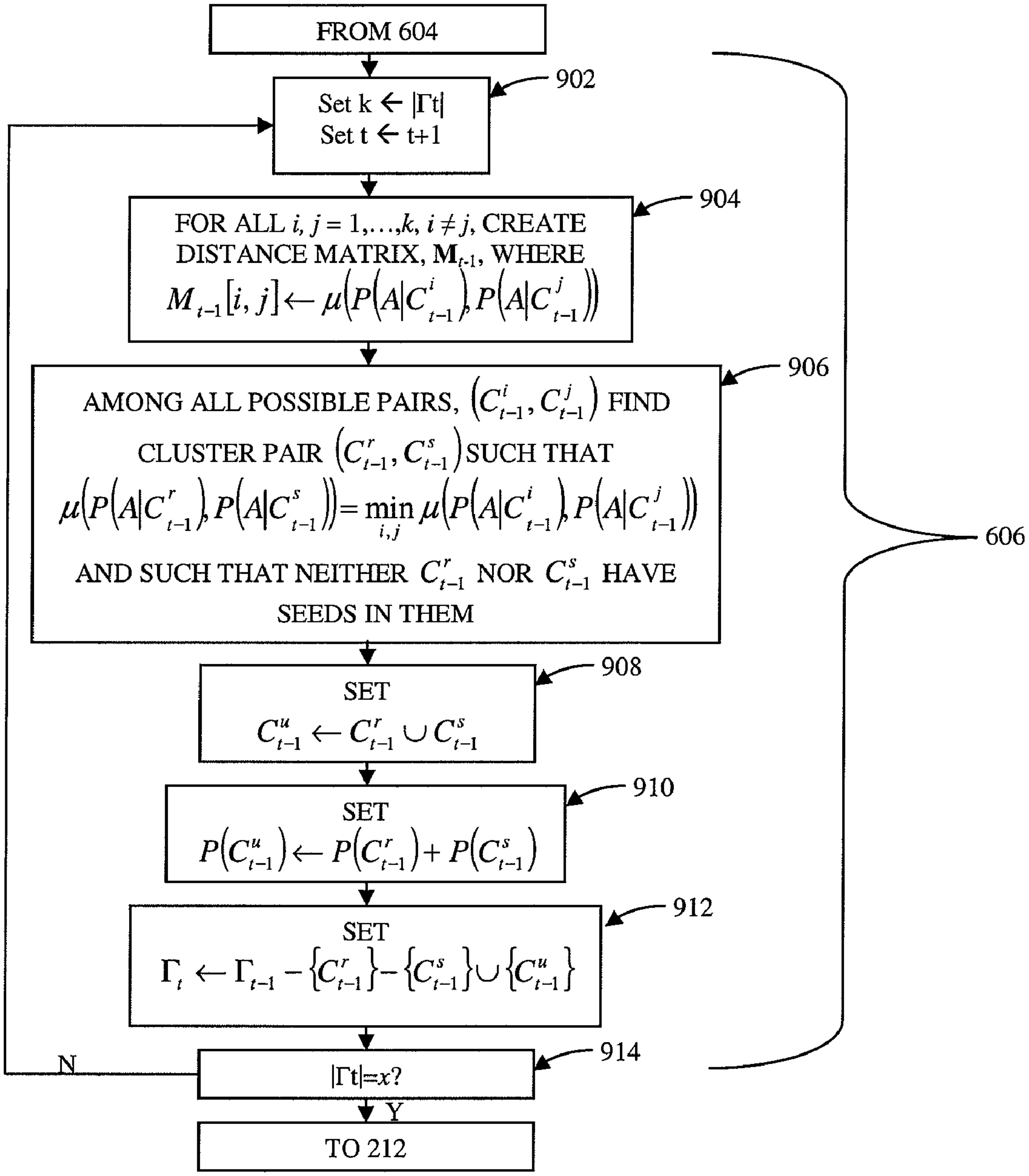
FIG. 9 illustrates an exemplary process of building a truncated hierarchy in connection with the process shown in FIG. 6.

Referring to FIG. 9, the truncated hierarchy can be built, for example, by successively merging cluster pairs together according to a predetermined entropic similarity condition. In one embodiment, such a truncated hierarchy can be built, for example, by setting a cluster number variable, k, and the aforementioned taxonomy layer variable, t, (902), creating a distance matrix $M_{t-1}$ (904), identifying (e.g., selecting) a pair of clusters listed in the distance matrix $M_{t-1}$ according to a predetermined constraint condition and similarity condition (906), merging an identified (e.g., selected) cluster pair exhibiting the predetermined constraint and characterized by a value of a predetermined entropic similarity metric (i.e., an entropic similarity characteristic) that satisfies the predetermined entropic similarity condition (908), setting the marginal probability of the merged cluster pair (910), creating a new taxonomy layer containing the merged cluster pair in addition to all non-merged clusters (912), and determining whether the new taxonomy layer contains a number of clusters equal to the number of exemplars (914). If it is determined that the new taxonomy layer contains x clusters, then the truncated hierarchy is complete and the process proceeds to assign category labels for the generated taxonomy at 212. However, if it is determined that the new taxonomy layer does not contain x clusters, then the process flow is directed back to 902 and the aforementioned process is repeated. Thus, the aforementioned process is repeated until the number of clusters in the new taxonomy layer is equal to the number of exemplars received at 206.

Upon initially performing 902, the value of the cluster number variable, k, is inherited from 602 and the value of the taxonomy layer variable, t, is inherited from 802 and incremented by one. Subsequent values of the cluster number variable, k, and the taxonomy layer variable, t, are based on the number of clusters contained within each new taxonomy (i.e., dendrogram) layer after cluster pairs have been merged and non-merged clusters have been isomorphically mapped from preceding taxonomy layers.

In one embodiment, the distance matrix $M_{t-1}$ created at 904 is an i×j matrix (i=j=1, . . . , k) listing all possible combinations of clusters present within the taxonomy layer $\Gamma_{t-1}$. In another embodiment, each entry within the distance matrix $M_{t-1}$ identifies a degree of similarity between a cluster identified in the $i^{th}$ row and a cluster identified in the $j^{th}$ column of the distance matrix $M_{t-1}$.

Where clusters are internally represented under the l-norm representation schema, the degree of similarity can be represented by an entropic distance metric, μ that characterizes a measure of the divergence (or proximity) between every possible pair-wise combination of clusters present within the taxonomy layer $\Gamma_{t-1}$. In one embodiment, values for the entropic distance metric, μ, can be obtained using principles related to information-theoretic data compression.

According to information-theoretic data compression, if the value-set of a random variable X is compressed into a smaller-sized value-set of another random variable Y, and if both X and Y contain information about a third random variable Z, then. The information content of Y is always upper-bounded by (i.e., less than or equal to) the information content of X, which means there is always some finite amount of information loss when X is compressed to Y.

Applying the aforementioned information-theoretic compression principles to the context of generating a taxonomy of categorical data, the information content of $\Gamma_{t-1}$, about the global vocabulary A, is defined as:

$$I(A,\Gamma_{t-1})=H(A)-H(A|\Gamma_{t-1}),$$

where H(A) is the absolute entropy and $H(A|\Gamma_{t-1})$ is the $\Gamma_{t-1}$-conditional entropy of A. Similarly, the information content of $\Gamma_t$, about the global vocabulary A, is $I(A,\Gamma_t)$.

During the hierarchical agglomerative clustering process, $\Gamma_t$ is created from $\Gamma_{t-1}$ and the loss of information content (i.e., information loss or differential mutual information) incurred when $\Gamma_t$ is generated from $\Gamma_{t-1}$ is defined as:

$$\delta I(\Gamma_{t-1},\Gamma_t)=I(A,\Gamma_{t-1})-I(A,\Gamma_t)=H(A|\Gamma_t)-H(A|\Gamma_{t-1}).$$

As shown above, the amount of information loss incurred when $\Gamma_t$ is generated from $\Gamma_{t-1}$ is equal to the increase in the conditional uncertainty when $\Gamma_t$ is generated from $\Gamma_{t-1}$. Accordingly, the equivalence between differential mutual information $\delta I(\Gamma_{t-1},\Gamma_t)$ and μ is as follows:

$$\delta I(\Gamma_{t-1},\Gamma_t)=\mu(P(A|C_{t-1}^i),P(A|C_{t-1}^j))$$

In one embodiment, the differential mutual information $\delta I(\Gamma_{t-1},\Gamma_t)$ can be determined based on the well known Jensen-Shannon (JS) divergence measure, quantifying the difference between two or more probability distributions, which are transformed representations of categorical data vectors. The JS measure is built upon the Kullback-Leibler (KL) divergence measure and, therefore, inherits all the properties of KL divergence. However, the JS measure does not suffer from the singularity problem. Moreover, the JS divergence can be generalized to more than two distributions and argument distributions can be weighted.

For any two arbitrary, mutually exclusive clusters, $C_{t-1}^i$, $C_{t-1}^j \in \Gamma_{t-1}$, with respective likelihood probabilities $\pi_i$ and $\pi_j$, let the union be $C_{t-1}^u=C_{t-1}^i \cup C_{t-1}^j$, with corresponding likelihood probability $\pi_u=\pi_i+\pi_j$. The probability mass function representation of the merged cluster $C_{t-1}^u$ over the attribute space can be defined as the weighted mean of the probability functions of $C_{t-1}^i$ and $C_{t-1}^j$:

$$P(A|C_{t-1}^u)=\frac{\pi_i}{\pi_u}P(A|C_{t-1}^i)+\frac{\pi_j}{\pi_u}P(A|C_{t-1}^j),$$

and the JS-divergence between $C_{t-1}^i$ and $C_{t-1}^j$:

$$JS(P(A|C_{t-1}^i)\|P(A|C_{t-1}^j))=\frac{\pi_i}{\pi_u}KL(P(A|C_{t-1}^i)\|P(A|C_{t-1}^u))+\frac{\pi_j}{\pi_u}KL(P(A|C_{t-1}^j)\|P(A|C_{t-1}^u)).$$

Using this JS-divergence function, the differential mutual information between $C_{t-1}^i$ and $C_{t-1}^j$ can be represented as a linear function of their JS-divergence:

$$\mu(P(A|C_{t-1}^i),P(A|C_{t-1}^j))=(\pi_i+\pi_j)JS(P(A|C_{t-1}^i)\|P(A|C_{t-1}^j)).$$

Thus, for each i=1, . . . , m, and for each j=1, . . . , k, the entry M[i, j] created at 904 denotes $\mu(P(A|C_{t-1}^i),P(A|C_{t-1}^j))$ (i.e., the entropic distance between the $i^{th}$ and $j^{th}$ clusters in $\Gamma_{t-1}$).

As discussed above, the l-norm representation schema transforms each record and cluster into a set of d locally normalized probability distributions, one normalized probability distribution for each of the d attributes. Therefore, the entropic proximity or divergence measure between two records or clusters is a weighted summation of the entropic similarity or dissimilarity measure between respective intra-attribute probability functions. Assuming that the weight distribution over the attributes $A_1, A_2, \ldots, A_d$ is $\{\omega_1, \omega_2, \ldots, \omega_d\}$, each individual weight can be used to regulate the contribution of an entropic proximity or divergence measure specific to a particular attribute. In one embodiment, the entropic divergence measure is obtained as follows:

$$M_{t-1}[i,j] \leftarrow \sum_{q=1}^{d} \exp(-\lambda\omega_q)\mu(P(A_q|C_{t-1}^i), P(A_q|C_{t-1}^j)),$$

and the entropic proximity measure as follows:

$$M_{t-1}[i,j] \leftarrow \sum_{q=1}^{d} \omega_q \exp(-\lambda\mu(P(A_q|C_{t-1}^i), P(A_q|C_{t-1}^j))),$$

where $\lambda$ is a gradient-controlling parameter of the entropic measure $\mu$.

In many embodiments, less weight may be given to the divergence between two probability components if the corresponding attribute is of a higher weight while more weight may be given the proximity between two probability components if the corresponding attribute is of a higher weight.

In view of the above, the predetermined entropic similarity condition, from which a cluster pair is at least partially identified at 906, represents a minimal amount of information loss incurred as a result of generating a new taxonomy layer $\Gamma_t$ from a previous taxonomy layer $\Gamma_{t-1}$. Referring back to the principles of information-theoretic data compression, a high-quality data compression is achieved when the amount of information loss is minimized. Accordingly, and as applied to the present case of building the hierarchy, pairs of clusters listed in the distance matrix $M_{t-1}$ are identified at 906 at least partially by identifying a cluster pair listed within the distance matrix $M_{t-1}$ that, when merged, will minimize the amount of information loss $\delta I(\Gamma_{t-1},\Gamma_t)$ incurred when $\Gamma_t$ is generated from $\Gamma_{t-1}$. Stated another way, pairs of clusters listed in the distance matrix $M_{t-1}$ are identified at 906 at least partially by identifying a cluster pair listed within the distance matrix $M_{t-1}$ which, when merged, will maximize the reduction of uncertainty as numerous, smaller-sized clusters are grouped into fewer, larger-sized clusters.

In an embodiment where the entropic distance metric, $\mu$, represents a measure of proximity (i.e., closeness) between clusters $C_{t-1}^i$ and $C_{t-1}^j$, clusters $C_{t-1}^r$ and $C_{t-1}^s$ are at least partially identified for which $\mu(P(A|C_{t-1}^i),P(A|C_{t-1}^j))$ is a maximum (i.e., a maximum entropic proximity), resulting in the equivalence:

$$\min \delta I(\Gamma_{t-1}, \Gamma_t) \equiv \max_{i,j} \mu(P(A|C_{t-1}^i), P(A|C_{t-1}^j)).$$

In an embodiment where the entropic distance metric, $\mu$, represents a measure of divergence (i.e., farness) between clusters $C_{t-1}^i$ and $C_{t-1}^j$, clusters $C_{t-1}^r$ and $C_{t-1}^s$ are at least partially identified for which $\mu(P(A|C_{t-1}^i),P(A|C_{t-1}^j)$ is a minimum (i.e., a minimum entropic divergence), resulting in the equivalence:

$$\min \delta I(\Gamma_{t-1}, \Gamma_t) \equiv \max_{i,j} \mu(P(A|C_{t-1}^i), P(A|C_{t-1}^j)).$$

In one embodiment, the predetermined constraint condition, from which a cluster pair is at least partially identified at 906, represents whether or not the cluster pair contains more than one exemplar $\{d_{m+1}, \ldots, d_{m+x}\}$. Accordingly, pairs of clusters listed in the distance matrix $M_{t-1}$ are identified at 906 at least partially by identifying a cluster pair listed within the distance matrix $M_{t-1}$ that, when merged, will contain less than two exemplars $\{d_{m+1}, \ldots, d_{m+x}\}$.

Thus, clusters $C_{t-1}^i$ and $C_{t-1}^j$ are identified and marked as $C_{t-1}^r$ and $C_{t-1}^s$, respectively, at 906 if they have a maximum amount of overlap in the information that they contain about A and do not both contain an exemplar $\{d_{m+1}, \ldots, d_{m+x}\}$.

In one embodiment, clusters can be merged at 908 by performing a union operation of all identified clusters $C_{t-1}^r$ and $C_{t-1}^s$ to form $C_{t-1}^u$ (i.e., $C_{t-1}^u \leftarrow C_{t-1}^r \cup C_{t-1}^s$). Accordingly, each merged cluster $C_{t-1}^u$ represents the union of a plurality of clusters. As mentioned above each leaf cluster $C_1^i$ is identified by an underlying vector. In one embodiment, $C_{t-1}^u$ can be identified by an underlying vector representing the centroid of the plurality of clusters it contains. For the sake of ease of exposition, no formal distinction will be drawn between a merged cluster and the underlying vector identifying the merged cluster.

In one embodiment, the new taxonomy layer can be created at 912 by isomorphically mapping the non-merged clusters onto the new taxonomy layer.

An exemplary method of identifying a pair of clusters listed in the distance matrix $M_{t-1}$ according to predetermined constraint and similarity conditions as discussed above with respect to 906 to facilitate merging identified clusters into a single cluster at 908 will now be discussed in greater detail with respect to FIG. 10.

Figure 10:
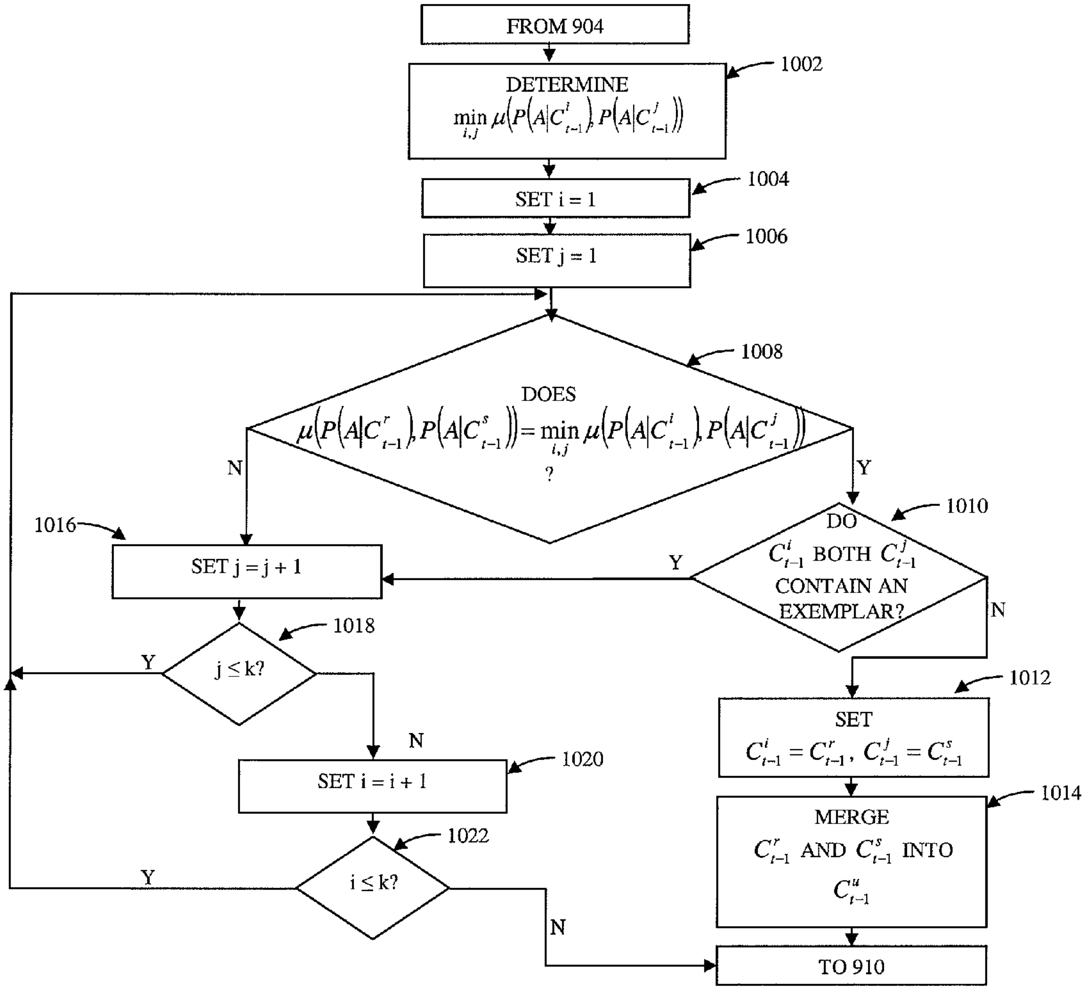
FIG. 10 illustrates an exemplary process of identifying and merging cluster pairs in accordance in connection with the process shown in FIG. 9.

Referring to FIG. 10, an exemplary identification and merging process can be accomplished by, for example, determining for all entries within the distance matrix $M_{t-1}$, $$\min_{i,j} \mu(P(A|C_{t-1}^i), P(A|C_{t-1}^j))$$

when the entropic distance metric, $\mu$, represents a measure of divergence (1002), setting a distance matrix row counter variable, i, equal to 1 (1004), setting a distance matrix column counter variable, j, equal to 1 (1006), and determining whether the $$\mu(P(A|C_{t-1}^i), P(A|C_{t-1}^j)) = \min_{i,j} \mu(P(A|C_{t-1}^i), P(A|C_{t-1}^j))$$

(1008). In embodiments where the entropic distance metric, $\mu$, represents a measure of proximity, 1002 can be accomplished by determining, for all entries within the distance matrix $M_{t-1}$, $$\max_{i,j} \mu(P(A|C_{t-1}^i), P(A|C_{t-1}^j)).$$

If, as a result of 1008, it is determined that $$\mu(P(A|C_{t-1}^i), P(A|C_{t-1}^j)) = \min_{i,j} \mu(P(A|C_{t-1}^i), P(A|C_{t-1}^j)),$$

the process flow is directed to 1010 where it is determined whether both clusters $C_{t-1}^i$ and $C_{t-1}^j$ contain an exemplar $\{d_{m+1}, \ldots, d_{m+x}\}$. If, as a result of 1010, it is determined that both $C_{t-1}^i$ and $C_{t-1}^j$ do not contain an exemplar (e.g., that $C_{t-1}^i$ contains an exemplar but that $C_{t-1}^{j}$ does not contain an exemplar, that $C_{t-1}^{j}$ contains an exemplar but that $C_{t-1}^{i}$ does not contain an exemplar, or that neither $C_{t-1}^{j}$ nor $C_{t-1}^{i}$ contain an exemplar), then the process flow proceeds to 1012 where $C_{t-1}^{i}$ and $C_{t-1}^{j}$ are marked $C_{t-1}^{r}$ and $C_{t-1}^{s}$, respectively, and are subsequently merged into a single cluster $C_{t-1}^{u}$ at 1014. The process flow then continues to 910 discussed above.

If, as a result of 1008, it is determined that $$\mu(P(A|C_{t-1}^{i}), P(A|C_{t-1}^{j})) \neq \min_{i,j} \mu(P(A|C_{t-1}^{i}), P(A|C_{t-1}^{j}))$$

(or if, as a result of 1010, it is determined that both $C_{t-1}^{i}$ and $C_{t-1}^{j}$ contain an exemplar), then the process flow proceeds directly to 1016 where the distance matrix column counter variable, j, is incremented by 1 and, subsequently at 1018, it is determined whether the incremented distance matrix column counter variable, j, exceeds the total number of clusters, k, within the taxonomy layer $\Gamma_{t-1}$.

If, as a result of 1018, it is determined that the incremented distance matrix column counter variable, j, is less than or equal to the total number of clusters, k, the process flow is directed back to 1008. If, as a result of 1018, it is determined that the incremented distance matrix column counter variable, j, is greater than the total number of clusters, k, the process flow continues to 1020 where the distance matrix row counter variable, i, is incremented by 1 and, subsequently at 1022, it is determined whether the incremented distance matrix column row variable, i, exceeds the total number of clusters, k, within the taxonomy layer $\Gamma_{t-1}$.

If, as a result of 1022, it is determined that the incremented distance matrix column row variable, i, is less than or equal to the total number of clusters, k, the process flow is directed back to 1008. If, as a result of 1022, it is determined that the incremented distance matrix row counter variable, i, is greater than the total number of clusters, k, the process flow continues to 910 discussed above.

Referring back to FIG. 2, at 212, category labels are assigned to each cluster created upon generating the taxonomy at 210. In one embodiment, each category label is descriptive of the contents of the cluster it is assigned to and can be assigned manually and/or automatically by the system by any known means. In another embodiment, the category label for each cluster corresponds to the centroid of that cluster. As all taxonomies generally represent a summary of the dataset from, the accuracy of the summary inherently depends on the amount of information that is retained within the taxonomy. Since the clustering process described above mninimizes the amount of information that is lost between each taxonomy layer (i.e., maximizes the reduction of uncertainty as the clusters are grouped into fewer and larger-sized clusters), the accuracy of the summary of the dataset generated according to embodiments of the invention described above is maximized.

As discussed above, the partial taxonomy generated as discussed above with respect to 606 provides a truncated hierarchy that is created according to the constrained agglomeration process exemplarily discussed with respect to FIGS. 6 to 10. In a further embodiment, the partial taxonomy Γ can be completed using an unconstrained agglomeration process similar to that described with respect to FIGS. 9 and 10.

For example, the partial taxonomy generated at 210 can be completed by representing the uppermost layer of the partial taxonomy as an intermediate taxonomy layer and appending a non-truncated hierarchy to the partial taxonomy in an unconstrained hierarchical agglomerative clustering process. In one embodiment, the unconstrained hierarchical agglomerative clustering process is a clustering process that partitions the dataset D into k mutually exclusive clusters (where $k \leqq x$), $C_1, C_2, \ldots, C_k$, such that the following conditions are satisfied:

1. For all i=1, . . . , k, $C_i$ is a non-null subset;
2. For all i, j=1, . . . , k, i≠j, $C_i$ and $C_j$ are non-overlapping, i.e., $C_i \cap C_j$ is null; and
3. All the clusters, when combined together, are exhaustive, i.e., $\cup_{i=1}^{k} C_i = D$.

Figure 11:
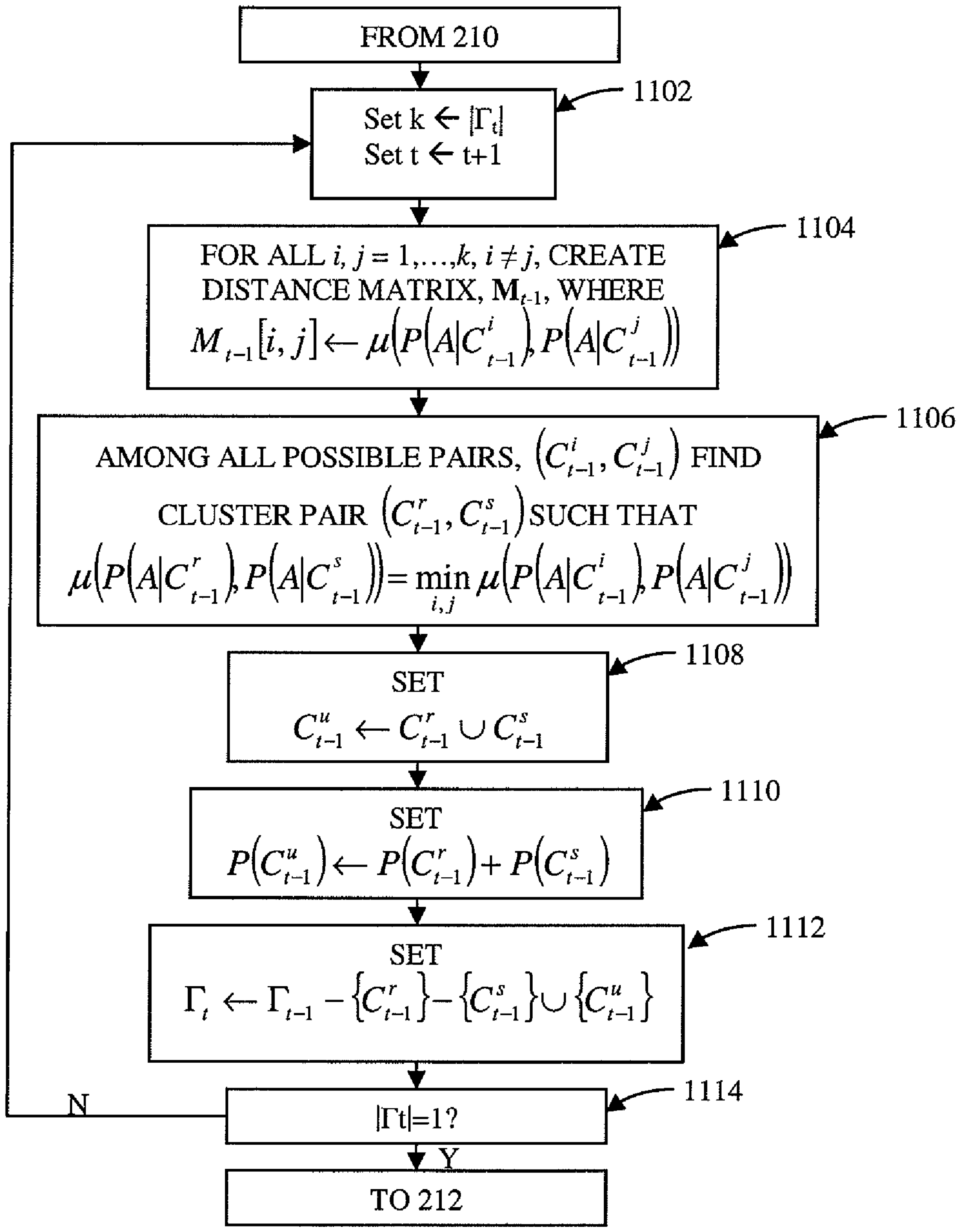
FIG. 11 illustrates an exemplary process of building a non-truncated hierarchy in accordance with an embodiment of the present invention.

Referring to FIG. 11, the non-truncated hierarchy can be built, for example, by setting the aforementioned cluster and taxonomy number variables, k and t, respectively (1102), creating a distance matrix $M_{t-1}$ (1104), identifying a pair of clusters listed in the distance matrix $M_{t-1}$ according to a predetermined entropic similarity condition (1106), merging an identified cluster pair exhibiting the predetermined entropic similarity condition (1108), setting the marginal probability of the merged cluster pair (1110), creating a new taxonomy layer containing the merged cluster pair in addition to all non-merged clusters (1112), and determining whether the new taxonomy layer contains a single cluster (1114). If it is determined that the new taxonomy layer contains a single cluster, then the non-truncated hierarchy is complete and the process proceeds to 212. However, if it is determined that the new taxonomy layer does not contain a single cluster, then the process flow is directed back to 1102.

Upon initially performing 1102, the value of the cluster number variable, k, is set to x and the value of the taxonomy layer variable, t, is set to g and incremented by one. Subsequent values of the cluster number variable, k, and the taxonomy layer variable, t, are based on the number of clusters contained within each new taxonomy layer after cluster pairs have been merged and non-merged clusters have been isomorphically mapped from preceding taxonomy layers.

The distance matrix $M_{t-1}$ created at 1104 is created in the same manner as previously discussed with respect to 904. Moreover, the predetermined entropic similarity condition, from which a cluster pair is identified at 1106, represents a minimal amount of information loss incurred as a result of generating a new taxonomy layer $\Gamma_t$ from a previous taxonomy layer $\Gamma_{t-1}$ as similarly discussed with respect to 906. Accordingly, a pair of clusters listed in the distance matrix $M_{t-1}$ is identified at 1106 by identifying a cluster pair listed within the distance matrix $M_{t-1}$ that, when merged, will minimize the amount of information loss $\delta I(\Gamma_{t-1}, \Gamma_t)$ incurred when $\Gamma_t$ is generated from $\Gamma_{t-1}$. Stated another way, a pair of clusters listed in the distance matrix $M_{t-1}$ is identified at 1106 by identifying a cluster pair listed within the distance matrix $M_{t-1}$ which, when merged, will maximize the reduction of uncertainty as numerous, smaller-sized clusters are grouped into fewer, larger-sized clusters.

In one embodiment, clusters can be merged at 1108 in the same manner as previously described at 908. Moreover, a new taxonomy layer can be created at 1112 in the same manner as previously described at 912.

An exemplary method of identifying pairs of clusters listed in the distance matrix $M_{t-1}$ according to a predetermined entropic similarity condition as discussed above with respect to 1106 to facilitate merging identified clusters into a single cluster at 1108 will now be discussed in greater detail with respect to FIG. 12.

Figure 12:
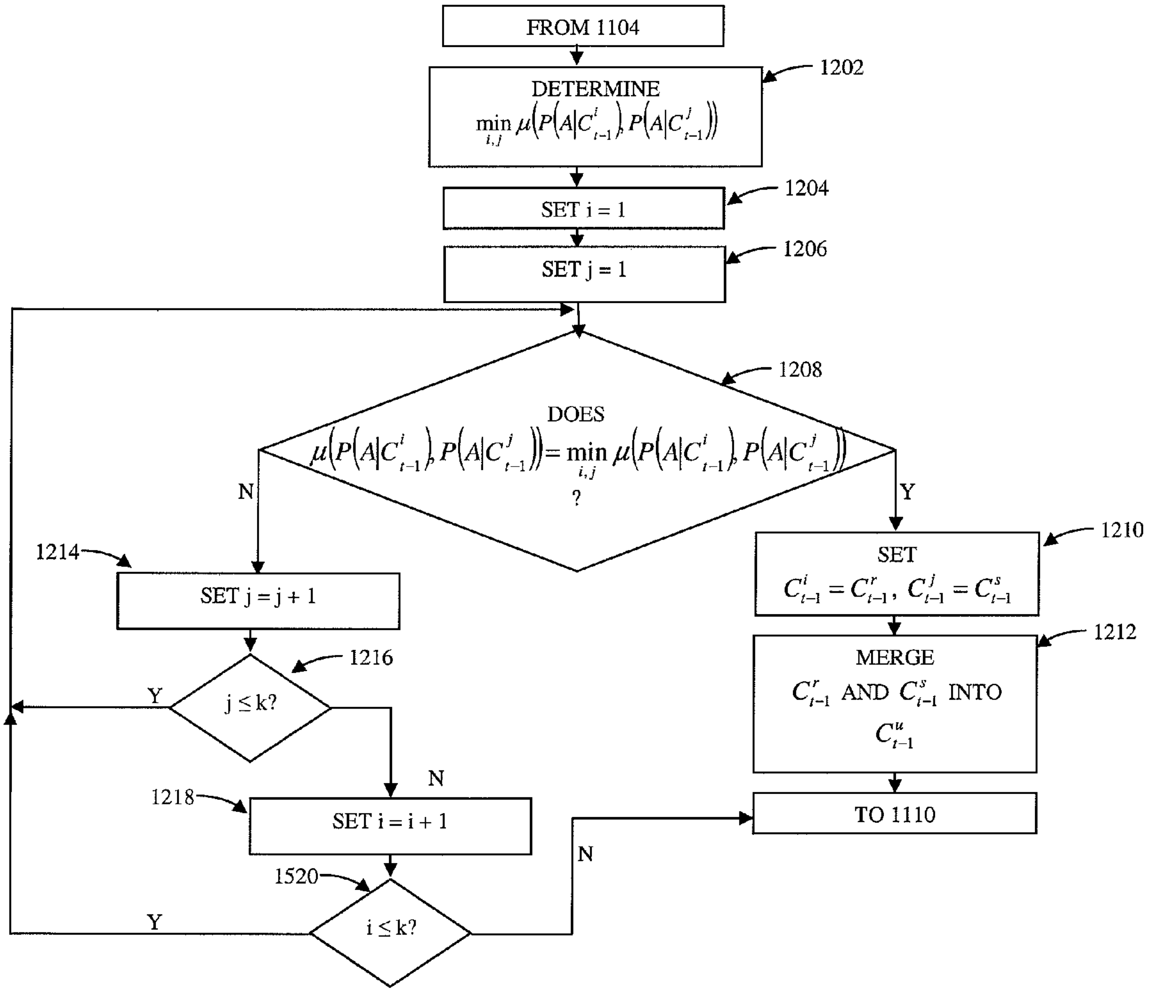
FIG. 12 illustrates an exemplary process of identifying and merging cluster pairs in accordance in connection with the process shown in FIG. 11.

Referring to FIG. 12, an exemplary identification and merging process can be accomplished by, for example, determining for all entries within the distance matrix $M_{t-1}$, $$\min_{i,j} \mu(P(A|C_{t-1}^{i}), P(A|C_{t-1}^{j}))$$

wherein the entropic distance metric, μ, represents a measure of divergence (1202), setting a distance matrix row counter variable, i, equal to 1 (1204), setting a distance matrix column counter variable, j, equal to 1 (1206), and determining whether the $$\mu(P(A|C_{t-1}^{i}), P(A|C_{t-1}^{j})) = \min_{i,j} \mu(P(A|C_{t-1}^{i}), P(A|C_{t-1}^{j}))$$

(1208). In embodiments where the entropic distance metric, μ, represents a measure of proximity, 1202 can be accomplished by determining, for all entries within the distance matrix $M_{t-1}$, $$\max_{i,j} \mu(P(A|C_{t-1}^{i}), P(A|C_{t-1}^{j})).$$

If, as a result of 1208, it is determined that $$\mu(P(A|C_{t-1}^{i}), P(A|C_{t-1}^{j})) = \min_{i,j} \mu(P(A|C_{t-1}^{i}), P(A|C_{t-1}^{j})),$$

then the process flow proceeds to 1210 where $C_{t-1}^{i}$ and $C_{t-1}^{j}$ are marked $C_{t-1}^{r}$ and $C_{t-1}^{s}$, respectively, and are subsequently merged into a single cluster $C_{t-1}^{u}$ at 1212. The process flow then continues to 1110 discussed above.

If, as a result of 1208, it is determined that $$\mu(P(A|C_{t-1}^{i}), P(A|C_{t-1}^{j})) \neq \min_{i,j} \mu(P(A|C_{t-1}^{i}), P(A|C_{t-1}^{j})),$$

then the process flow proceeds directly to 1214 where the distance matrix column counter variable, j, is incremented by 1 and, subsequently at 1216, it is determined whether the incremented distance matrix column counter variable, j, exceeds the total number of clusters, k, within the taxonomy layer $\Gamma_{t-1}$.

If, as a result of 1216, it is determined that the incremented distance matrix column counter variable, j, is less than or equal to the total number of clusters, k, the process flow is directed back to 1208. If, as a result of 1216, it is determined that the incremented distance matrix column counter variable, j, is greater than the total number of clusters, k, the process flow continues to 1218 where the distance matrix row counter variable, i, is incremented by 1 and, subsequently at 1220, it is determined whether the incremented distance matrix column row variable, i, exceeds the total number of clusters, k, within the taxonomy layer $\Gamma_{t-1}$.

If, as a result of 1220, it is determined that the incremented distance matrix column row variable, i, is less than or equal to the total number of clusters, k, the process flow is directed back to 1208. If, as a result of 1220, it is determined that the incremented distance matrix row counter variable, i, is greater than the total number of clusters, k, the process flow continues to 1110 discussed above.

As discussed above, the numerous embodiments discussed above provide a taxonomy generated in accordance with a seed based clustering system and method. The taxonomy that has been generated from the categorical dataset can be used in various ways. For example, the taxonomy can be used as an indexed organization of the categorical dataset or a layer within the taxonomy can be selected to characterize and classify the categorical dataset. An exemplary process of classifying records within the categorical dataset can include treating the selected taxonomy layer as a nearest neighbor classifier.

While the invention herein disclosed has been described by means of specific embodiments, examples and applications thereof, numerous modifications and variations could be made thereto by those skilled in the art without departing from the scope of the invention set forth in the claims.

What is claimed is:

1. A computerized method of representing a dataset with a taxonomy, comprising:

augmenting a dataset containing a plurality of records with a plurality of predetermined exemplars;

representing the plurality of records and predetermined exemplars within the augmented dataset as a plurality of clusters in an initial taxonomy layer;

generating a truncated hierarchy of cluster sets based on clusters within the initial taxonomy layer, wherein clusters within the truncated hierarchy contain no more than a predetermined number of exemplars;

labeling clusters within the truncated hierarchy;

representing an uppermost layer of the truncated hierarchy as an intermediate taxonomy layer;

generating a non-truncated hierarchy from clusters within the intermediate taxonomy layer, wherein clusters within the non-truncated hierarchy contain more than the predetermined number of exemplars; and wherein the computerized method of representing a dataset with a taxonomy occurs within a physical computer.

2. The method of claim 1, wherein the predetermined number of exemplars is one exemplar.

3. The method of claim 1, wherein generating the truncated hierarchy comprises successively merging clusters together according to a predetermined entropic similarity condition.

4. The method of claim 3, wherein successively merging clusters together comprises:

characterizing pairs of each of the plurality of clusters according to a predetermined entropic similarity metric;

determining which cluster pairs have an entropic similarity characteristic that satisfies the predetermined entropic similarity condition;

selecting a cluster pair characterized by a value of the predetermined entropic similarity metric that satisfies the predetermined entropic similarity condition and that contains no more than the predetermined number of exemplars; and merging the selected cluster pair into a single cluster.

5. The method of claim 4, further comprising:

creating a new dendrogram layer, the new taxonomy layer including the merged cluster pair;

isomorphically mapping all non-merged clusters into the new taxonomy layer; and repeating the characterizing, determining, selecting, merging, creating, and isomorphically mapping until the number of clusters in the new taxonomy layer is equal to the number of predetermined exemplars within the augmented dataset.

6. The method of claim 4, wherein selecting a cluster pair characterized by a value of the predetermined entropic similarity metric that satisfies the predetermined entropic similarity condition comprises selecting a cluster pair that has a minimum entropic divergence.

7. The method of claim 4, wherein selecting a cluster pair characterized by a value of the predetermined entropic similarity metric that satisfies the predetermined entropic similarity condition comprises selecting a cluster pair that has a maximum entropic proximity.

8. The method of claim 1, wherein generating the non-truncated hierarchy comprises successively merging pairs of clusters together according to a predetermined entropic similarity condition.

9. A computer program product comprising a physical computer usable medium having computer readable code embodied therein for causing a physical computer to effect:

augmenting a dataset containing a plurality of records with a plurality of predetermined exemplars;

representing the plurality of records and predetermined exemplars within the augmented dataset as a plurality of clusters in an initial taxonomy layer;

generating a truncated hierarchy of cluster sets based on clusters within the initial taxonomy layer, wherein clusters within the truncated hierarchy contain no more than a predetermined number of exemplars;

labeling clusters within the truncated hierarchy;

representing an uppermost layer of the truncated hierarchy as an intermediate taxonomy layer; and generating a non-truncated hierarchy from clusters within the intermediate taxonomy layer, wherein clusters within the non-truncated hierarchy contain more than the predetermined number of exemplars.

10. The computer program product of claim 9, wherein the predetermined number of exemplars is one exemplar.

11. The computer program product of claim 9, further comprising a computer usable medium having computer readable code embodied therein for causing a computer to effect generating the truncated hierarchy by successively merging pairs of clusters together according to a predetermined entropic similarity condition.

12. The computer program product of claim 11, further comprising a computer usable medium having computer readable code embodied therein for causing a computer to effect:

characterizing pairs of each of the plurality of clusters according to a predetermined entropic similarity metric;

determining which cluster pairs have a entropic similarity characteristic that satisfies the predetermined entropic similarity condition;

selecting a cluster pair characterized by a value of the predetermined entropic similarity metric that satisfies the predetermined entropic similarity condition and that contains no more than the predetermined number of exemplars; and merging the selected cluster pair into a single cluster.

13. The computer program product of claim 12, further comprising a computer usable medium having computer readable code embodied therein for causing a computer to effect:

creating a new dendrogram layer, the new taxonomy layer including the merged cluster pair;

isomorphically mapping all non-merged clusters into the new taxonomy layer; and repeating the characterizing, determining, selecting, merging, creating, and isomorphically mapping until the number of clusters in the new taxonomy is equal to the number of predetermined exemplars within the augmented dataset.

14. The computer program product of claim 12, further comprising a computer usable medium having computer readable code embodied therein for causing a computer to effect selecting a cluster pair characterized by a value of the predetermined entropic similarity metric that satisfies the predetermined entropic similarity condition by selecting a cluster pair that has a minimum entropic divergence.

15. The computer program product of claim 12, further comprising a computer usable medium having computer readable code embodied therein for causing a computer to effect selecting a cluster pair characterized by a value of the predetermined entropic similarity metric that satisfies the predetermined entropic similarity condition by selecting a cluster pair that has a maximum entropic proximity.

16. The computer program product of claim 9, further comprising a computer usable medium having computer readable code embodied therein for causing a computer to effect generating the non-truncated hierarchy comprising successively merging pairs of clusters together according to a predetermined entropic similarity condition.

* * * * *

UNITED STATES PATENT AND TRADEMARK OFFICE

CERTIFICATE OF CORRECTION

PATENT NO. : 7,664,718 B2
APPLICATION NO. : 11/457115
DATED : February 16, 2010
INVENTOR(S) : Acharya et al.

It is certified that error appears in the above-identified patent and that said Letters Patent is hereby corrected as shown below:

Title Page, (*) Notice: Delete “431 days” and insert --650 days--.

Title Page, Item (56) under OTHER PUBLICATIONS, line 4, delete “Defintion” and insert --Definitions--.

Signed and Sealed this

Twenty-fourth Day of August, 2010

David J. Kappos

*Director of the United States Patent and Trademark Office*